US008767053B2

(12) United States Patent
Neal

(10) Patent No.: US 8,767,053 B2
(45) Date of Patent: Jul. 1, 2014

(54) METHOD AND APPARATUS FOR VIEWING STEREOSCOPIC VIDEO MATERIAL SIMULTANEOUSLY WITH MULTIPLE PARTICIPANTS

(75) Inventor: Greg Neal, Morgan Hill, CA (US)

(73) Assignee: STMicroelectronics, Inc., Coppell, TX (US)

( * ) Notice: Subject to any disclaimer, the term of this patent is extended or adjusted under 35 U.S.C. 154(b) by 366 days.

(21) Appl. No.: 12/869,673

(22) Filed: Aug. 26, 2010

(65) Prior Publication Data

US 2012/0050463 A1 Mar. 1, 2012

(51) Int. Cl.
*H04N 13/04* (2006.01)

(52) U.S. Cl.
CPC ........... *H04N 13/044* (2013.01); *H04N 13/047* (2013.01)
USPC ................... 348/52; 348/53; 348/42; 348/94; 348/95

(58) Field of Classification Search
CPC ........... H04N 13/0429; H04N 13/0431; G02B 27/011
See application file for complete search history.

(56) References Cited

U.S. PATENT DOCUMENTS 5,737,012 A * 4/1998 Tabata et al. .................... 348/53
6,853,357 B2 * 2/2005 Inoue et al. ....................... 345/9
7,184,025 B2 * 2/2007 Williams et al. .............. 345/169
7,190,825 B2 * 3/2007 Yoon ............................ 382/154
7,447,330 B2 * 11/2008 Yamasaki ..................... 382/100
7,864,432 B2 * 1/2011 Ottney .......................... 359/634
7,976,159 B2 * 7/2011 Jacobs et al. ............. 351/159.76
8,049,775 B2 * 11/2011 Maeda ............................ 348/47
8,116,557 B2 * 2/2012 Ha et al. ........................ 382/154
8,189,035 B2 * 5/2012 Yuan et al. ...................... 348/51
8,384,774 B2 * 2/2013 Gallagher ....................... 348/60
8,493,438 B2 * 7/2013 Bassali et al. .................. 348/51
8,674,980 B2 * 3/2014 Huang et al. .................. 345/419
8,687,053 B2 * 4/2014 Matsui et al. ................... 348/51
2009/0033588 A1 * 2/2009 Kajita et al. ................... 345/2.3
2009/0091656 A1 * 4/2009 Kitaru et al. .................. 348/554
2009/0219224 A1 * 9/2009 Elg .................................. 345/8
2010/0091093 A1 * 4/2010 Robinson ........................ 348/47
2010/0166338 A1 * 7/2010 Lee et al. ...................... 382/285
2010/0295924 A1 * 11/2010 Miyatani et al. ................ 348/46
2011/0032252 A1 * 2/2011 Ohta ............................ 345/419
2011/0089325 A1 * 4/2011 Ottney .......................... 250/333
2011/0109720 A1 * 5/2011 Smolic et al. ................... 348/43
2011/0199469 A1 * 8/2011 Gallagher ....................... 348/60
2012/0002064 A9 * 1/2012 Filipovich et al. ......... 348/217.1
2012/0105611 A1 * 5/2012 Godar ............................ 348/54

* cited by examiner

*Primary Examiner* — Sath V Perungavoor
*Assistant Examiner* — Matthew J Anderson
(74) *Attorney, Agent, or Firm* — Beyer Law Group LLP

(57) ABSTRACT

Methods and systems are described for enabling the viewing of positionally and orientationally modified stereoscopic video material using one or more participants with near-to-eye displays with video content appearance altered to accommodate changes in orientation and position of the display.

27 Claims, 4 Drawing Sheets

METHOD AND APPARATUS FOR VIEWING STEREOSCOPIC VIDEO MATERIAL SIMULTANEOUSLY WITH MULTIPLE PARTICIPANTS

TECHNICAL FIELD

The present invention relates generally to stereoscopic video technologies. In particular, this disclosure refers to devices capable of enabling the viewing of 3D with several participants using near-to-eye display devices at the same time and methodologies for enhancing the viewing experience. Supporting methods and systems are also described.

BACKGROUND OF THE INVENTION

Currently, most viewing of three-dimensional (3D) image and video content is done using stereoscopic source image information viewed through so called "shutter glasses" of various types. In general, this means that the same source display (e.g., an LCD) displays right eye and left eye images in alternate succession over time. The use of shutter glasses enables the correct image to be viewed by the correct eye at the correct time to enable the illusion of 3D content.

However, one of the limitations of the technology is the length of time it takes various LCD pixels and systems to change state, either to generate new image frames or to adjust the shutter glasses. The "slow" response times of LCD pixels presents some challenges that have yet to be overcome.

During use a display is refreshed with the current data starting with data at the top and then working its way down to the bottom for each frame (in a process well known in the art as analogous to rater scanning). After each frame and a short vertical blanking period a new frame is presented in the same top to bottom manner.

However, in a stereoscopic display the alternate frames have left and right eye images. This fact results in some application difficulties. Because the time required for each pixel to change state can be a significant portion of the frame time, there is little or no time during a frame when all of the pixels are representative of one single frame. More commonly, each frame contains some of the previous frames data. Since in 3D viewing the stereoscopic data is presented in alternating left and right eye formats, this feature presents some limitations to the technology.

Due to this lag in frame data change there is typically little or no time during frame when all of the display pixels represent only one frame's image data. As a consequence there is little or no time during a frame when the shutter glasses can be "opened" to view either a left or right eye view. Accordingly, numerous artifacts and reductions in the quality of the image viewing experience are commonly encountered using this approach.

Accordingly, there is a need for approaches that avoid the aforementioned problem and provide improved image quality in an economic fashion. This disclosure addresses some of those needs.

SUMMARY OF THE INVENTION

In one aspect of the invention an integrated circuit (IC) system enables stereoscopic source 3D content to be transmitted to a near eye display device. In one approach the chip includes a material source module for providing stereoscopic source 3D content and a receiver module for receiving a location signal from a positional and orientation indicator of a near-to-eye viewing device wherein the location signal carries position and orientation information concerning a near-to-eye viewing device. The chip further includes an image modification module for modifying the source 3D content to generate modified viewable image data for the near-to-eye viewing device. Said modified viewable image data is produced that compensates for changes in position and orientation of the near-to-eye viewing device relative to a referent site as the near-to-eye viewing device is moved. The chip further includes a transmitter for transmitting the modified viewable image to the near-to-eye viewing device for viewing.

In another aspect, an embodiment comprises an integrated circuit (IC) system suitable for use in a near-to-eye display device. The chip system includes a receiver for receiving stereoscopic source 3D content and a positional and orientation indicator. The IC system also includes an image modification module enabling modification of the source 3D content to generate modified viewable image data based on the 3D source data and the positional and orientation information.

In another embodiment, a method of enabling stereoscopic source 3D content to be viewed by a near-eye-display device is described. In one embodiment a method includes operations of: providing initial stereoscopic source 3D content; receiving location information concerning the position and orientation of a near-to-eye viewing device; modifying the initial content to produce modified viewable image data that compensates for changes in position and orientation of the near-to-eye viewing device; and transmitting the modified viewable image to the near-to-eye viewing device for viewing. Some embodiments accommodate several near-to-eye display devices. The method can be implemented as a set of computer executed instructions arranged on a tangible computer readable media which can include firmware.

Another embodiment can comprise a system of enabling a user to view modified 3D content as a user with near-to-eye display device is at different positions and/or orientations. Such can include a source device for providing stereoscopic source 3D content and a near eye viewing device for enabling position and orientation of the viewing device to be determined. Also, an image modification module enables modification of the source 3D content to generate modified viewable content that compensates for changes in position and orientation of near eye viewing device. The system also includes one or more the near eye viewing devices and can include a referent.

General aspects of the invention include, but are not limited to methods, systems, apparatus, and computer program products for enabling an enhanced viewing of 3D images especially among a plurality of viewers.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF PREFERRED EMBODIMENTS

Figure 1:
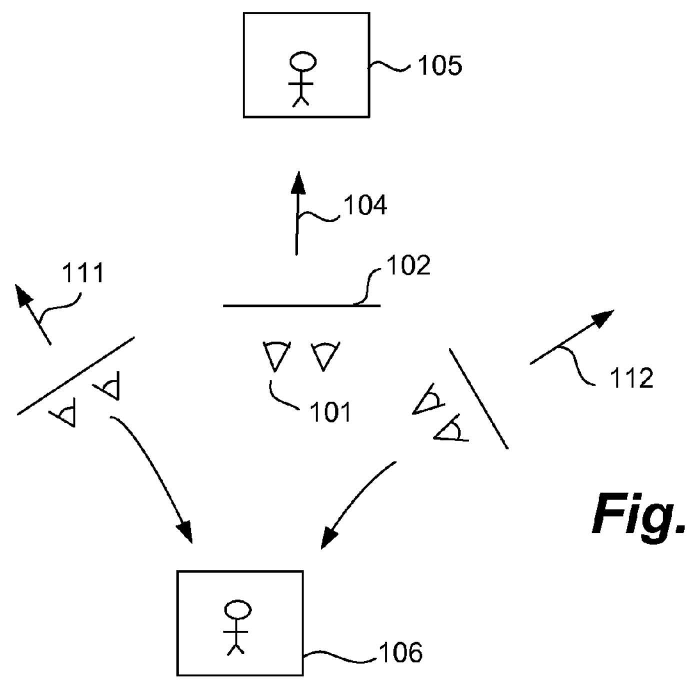
FIG. 1 illustrates an example of 3D image viewing in the absence of modified image generation.

Reference is made to particular embodiments of the invention. While the invention will be described in conjunction with particular embodiments, it will be understood that it is not intended to limit the invention to the described embodiments. To the contrary, it is intended to cover alternatives, modifications, and equivalents as may be included within the spirit and scope of the invention as defined by the appended claims.

Near-to-eye display devices frequently take the form of eye glasses. Relatively small, worn on the head and configured to display data (such as video and other multimedia content) in a number of common modes. In one approach, the inside face (that facing toward the eyes of the wearer) is opaque serving as a viewing screen for the user. Images can be presented on this face using a number of methods, including, but not limited to image projection or a simple LCD display formed on the inner surface of the display, optically coupled with the viewer's eyes such that the image can be focused by the viewer. Other such modes are known as well. Importantly, the user has relatively poor "real world" viewing capability as the opaque front face obscures the viewing area of the eye. The multimedia content is displayed on this inner surface. In some aspects this can be disorienting as regardless of the way a user orients, positions, or moves his head (and thereby the glasses) his real world view is obscured. Even more disorienting, the displayed multimedia content is essentially the same regardless of head orientation or movement.

In another near-to eye approach image data is still displayed using the inside face (that facing toward the eyes of the wearer) of a set of near-to eye glasses. However, in such an approach the inside face is configured to enable light emitting images to be displayed on the inner face of the glasses. When viewed against a dark background (e.g., black) excellent contrast between the light images and the background present multimedia data in a usable way. Gratings and partially minors viewing surface among other approaches enable such devices. However, this approach also demonstrates relatively poor "real world" viewing capability as the front face continuously displays images that obscures and distort the viewing area of the eye. As with the previously described approach this can be disorienting because regardless of the way a user orients, positions, or moves his head (and thereby the glasses) his real world view is obscured by displayed image. Also as above, this is also somewhat disorienting because the displayed multimedia content is essentially the same regardless of head orientation or movement of the user (glasses).

In still another application of near-to eye technology, image data is still displayed using the inside face (that facing toward the eyes of the wearer) of a set of near-to eye glasses. However, in this approach the inside face is configured to modulate light coming through the face enabling varying contrast to generate images viewable at the inner face of the glasses. When viewed against a light or neutral background (e.g., white) excellent contrast between the light and dark present multimedia data in a usable way. LCD's and other electrically modifiable surfaces can provide suitable media for this technology as can other approaches. However, this approach has also demonstrated relatively poor "real world" viewing capability as the front face continuously displays "image" that obscures and distorts the viewing area of the eye. In other words, as with the previously described approaches, this data display mode presents disorienting distortion because regardless of the way a user orients, positions, or moves his head (and thereby the glasses) his real world view is obscured by the interposition of image data between the eye and the real world surfaces and objects on the other side of viewing surface of the glasses. Also, as with the previously described approaches, such technologies can be disorienting because regardless of the way a user orients, positions, or moves his head the displayed multimedia content is essentially the same regardless of head orientation or movement of the user (glasses).

An example of some of these problems can be illustrated with reference to FIG. 1 which diagrammatically illustrates some of the issues. If the multimedia image 105 is displayed in a straight ahead approach and the viewer 101 is also looking at a near-to-eye display surface 102 that is oriented in a straight ahead viewing direction 104, an image like that of 106 is shown. But if the same viewer 101 was to turn their head to the left 111 and even move in that direction, the user does not perceive any change of orientation. No change of view is experienced. This effect is even more disorienting when 3D content and imagery is displayed. Similar effect is encountered upon orientation to the right and/or movement in that direction 112. Regardless of user 101 orientation or movement, the view is always the same 106.

In one aspect of the invention the glasses are modified in the way they display multimedia data (video, images, and so on). Virtual screen can be displayed and virtually arranged at a referent location. This feature can be enhanced by the placement of a real world background at the real world equivalent of the referent location. For example, a black screen, or a white screen, or even in some cases no screen at all can be arranged at the referent. This is very cheap. Additionally, in one example embodiment disclosed below a standard display screen can also be supplied at the referent location.

In addition the image processing can be conducted in a manner to simulate the existence of a real screen or display positioned at the referent. The simulation can be used to accommodate changes in viewer position and orientation and even compensate for things like changing parallax, perspective, and sizing should the source data support such data manipulation. Additionally, if the processing capacity of the system is sufficient, various render techniques and technologies can be used to also simulate such effects resultant from changing orientation and position of the viewer.

Once the referent location and virtual screen size is determined, this can be used by an image modification module (electronic circuitry configured to manipulate video and other image data) to present a more realistic virtual screen.

Figure 2:
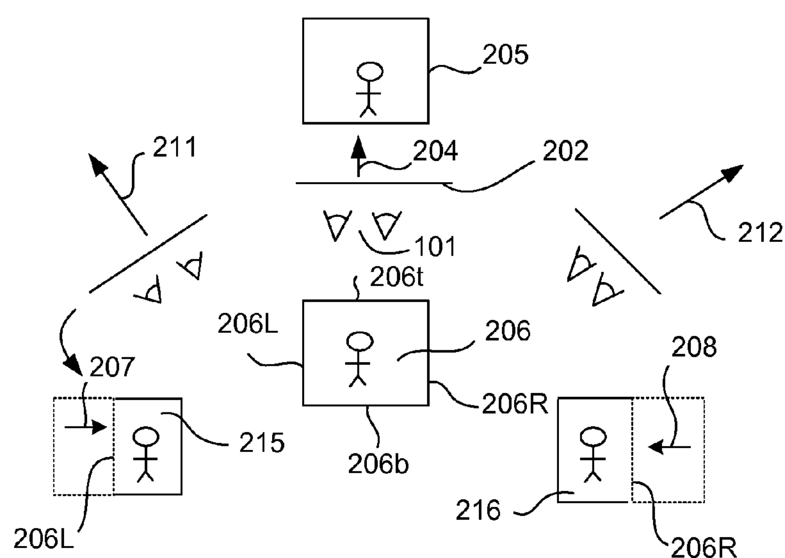
FIG. 2 diagrammatically illustrates an approach to using modified 3D image and video data to form a more realistic displayed image using near-to-eye display devices in accordance with the principles of the present invention.

For example, FIG. 2 presents a multimedia image 205 that is displayed in a straight ahead approach as above. Similarly, a viewer 101 looking at a near-to-eye display surface 202 oriented in a straight ahead direction 204 an image like that of 206 is shown. The image 206 is processed by circuitry of an image processing module to generate the rendered image 206 which, in this case, is much the same as viewed image 106. Accordingly, this viewing orientation and rendering is similar to the case depicted above. The virtual image 206 is shown with virtual boundaries. This can be used to define a virtual viewing "screen". In such a case, the boundaries demarcate screen edges. For example, as shown in this view, the virtual screen is demarcated with top virtual frame boundary 206*t*, bottom virtual frame boundary 206*b*, a left virtual frame boundary 206L, and a right virtual frame boundary 206R. These virtual frame boundaries can be used to assist in modeling and simulating the effects of movement and orientation changes of the user (and hence the glasses). For example, if the same viewer 101 was to turn their head to the left (viewing direction 211) processing circuitry will modify the initial image to generate modified viewable image data. For example, as the head is turned to the left, the modified viewable image data generates a virtual image 215 that will provide a different virtual view that simulates a real world effect of moving one's head in a specified manner. Thus, as shown here, a head turn to the left (viewing in direction 211) will result in a simulated effect intended to capture the effect of the change of the head turn to the left. For example, as the head is turned to the left, the virtual image shall appear to be stationary as the orientation changes. Thus, as the head is turned to the left the image frame moves to the right 207 such that the user perceives an apparent stationary image as the orientation of the head changes. In a similar fashion, as the head rotates to the left, the modified viewable image data depicts frame "movement" to the right to maintain the illusion of a stationary image frame. But as depicted the illusion is maintained by moving the left frame boundary 206L to the right as do the other aspects and objects within the depicted frame 215. Similarly, the right virtual frame boundary 206R shall appear to drift out of the viewing area to the right.

Also, the area to the left of the left virtual frame boundary 206L becomes an inactive portion of the near-to-eye view screen and no longer presents frame image information. In some cases this means that the viewer will be able to see through the front face 202 of the near-to-eye viewing apparatus to visualize the local environment. In other approaches (such as when the view screen is not transparent or partly transparent) the view will simply be blank.

As the head is turned to the right (e.g., to viewing direction 212), the image shall also appear to remain stationary. Thus, the viewed image moves to the left 208 such that the user perceives an apparent stationary image as the head is moved. In this depicted example, as the head rotates to the right the right frame boundary 206R shall move to the left as shall the other aspects and objects within the depicted frame 216. Also, the left virtual frame boundary 206L shall appear to drift out of the viewing area to the left. Similar to the mode described above, the area to the right of the right virtual frame boundary 206R forms an inactive portion that no longer presents frame image information. As before, in some embodiments this means that the viewer will be able to see through the front face 202 of the near-to-eye viewing apparatus. In other the view will simply be blank.

Figure 3A:
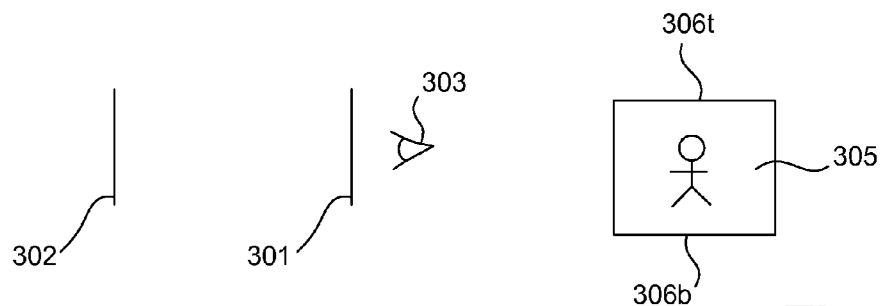
FIGS. 3(*a*) & 3(*b*) diagrammatically illustrate additional aspects of using modified 3D images and video data to form more realistic displayed images using near-to-eye display devices in accordance with the principles of the present invention.
Figure 3B:
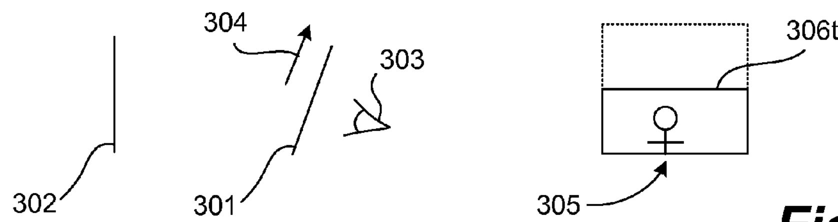

It should be noted that this effect can be applied to the top and bottom virtual frame boundaries 306*t*, 306*b* as shown in FIGS. 3(*a*) & 3(*b*) as well. Thus, as the head is tilted up and down a modified viewable image 305 takes this repositioning (reorientation) in to consideration in producing the modified viewable images. For example, an image 305 virtually displayed using the near-to-eye viewer 301 which displays the virtual image as if it were displayed at a reference location 302 (referent). If the viewer 303 tilts his head upward 304 the virtual frames are altered to maintain the illusion of a stationary image that does not move from the referent. Thus, in appearance, the top virtual frame boundary 306*t* moves lower in the display. It is also pointed out, that if the virtual image defines an area smaller than that which the near-to-eye display is capable of displaying the position of the entire frame just moves around in the display field of the viewer to compensate for the changes in orientation and position of the viewer (e.g., glasses).

Also, combinations of such boundary (and frame image content) motion can compensate for combinations of up and down orientation changes as well as side to side head orientation changes. Thus, nodding (up and down changes in orientation) and shaking (side to side changes in orientation) of the head can be compensated for in the generated modified viewable images to generate a seemingly stationary virtual image. The images can also be compensated to accommodate tilting of the head from side to side, distances between viewer and reference, as well as all other positions and orientations of a viewer.

Another attribute of the system is the way it can render the three dimensional arrangements of virtual objects presented by the multimedia content. Various rendering techniques (such as known to those of ordinary skill in the art) can be used to present various changes in perspective and spatial relationships should the content and the system support such functionality. For example, software, hardware, firmware and the like can be used to extract three dimensional content encoded into the source material or can be used to render different three dimensional views with the use of various 3D rendering processes. For example, source material having depth maps with material can be used to adjust for changes in position. Also, software and hardware of various systems can be used to process original source data to render different 3D views. Thus, changing perspective, parallax, and other space relational features can be captured and displayed as a user (or rather the viewer) changes position and orientation.

Figure 4:
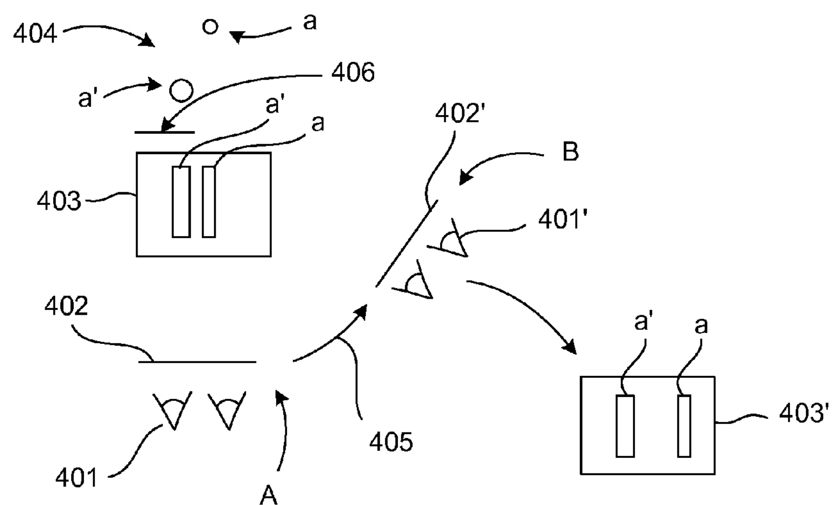
FIG. 4 diagrammatically illustrates an approach to using modified 3D image and video data to form a more realistic displayed image capturing depth aspects of the objects in a frame using near-to-eye display devices in accordance with the principles of the present invention.

One example embodiment is illustrated with respect to FIG. 4. A user 401 viewing a near-to-eye display surface 402 sees a modified viewable image displayed as 3D image 403. Because it is a 3D representation, the objects a, a' in the frame appear to have a specific three dimensional relationship 404 to each other. In this case, object "a" appears behind and to the right of object "a'". If the user moves 405 with respect to the referent 406 in a manner that changes the apparent spatial relationship between the objects a, a' the image presented in the displayed frame must reflect this change. In some source data this information is encoded directly into the source data (for example using a depth map) or is such that imaging rendering can be used to process the image to adjust to the change in position of the user.

Accordingly, when viewed from point A the frame depicts the image shown in 403. Also, when viewed from point B, the near-to-eye display 402' shows a frame 403' that depicts an image of the objects a, a' showing the differing parallax and change in apparent spacing just as if the objects a, a' were viewed from a different angle. Thus, adjustments in parallax and perspective are possible depending on the position and orientation of the near-to-eye display device.

Figure 5:
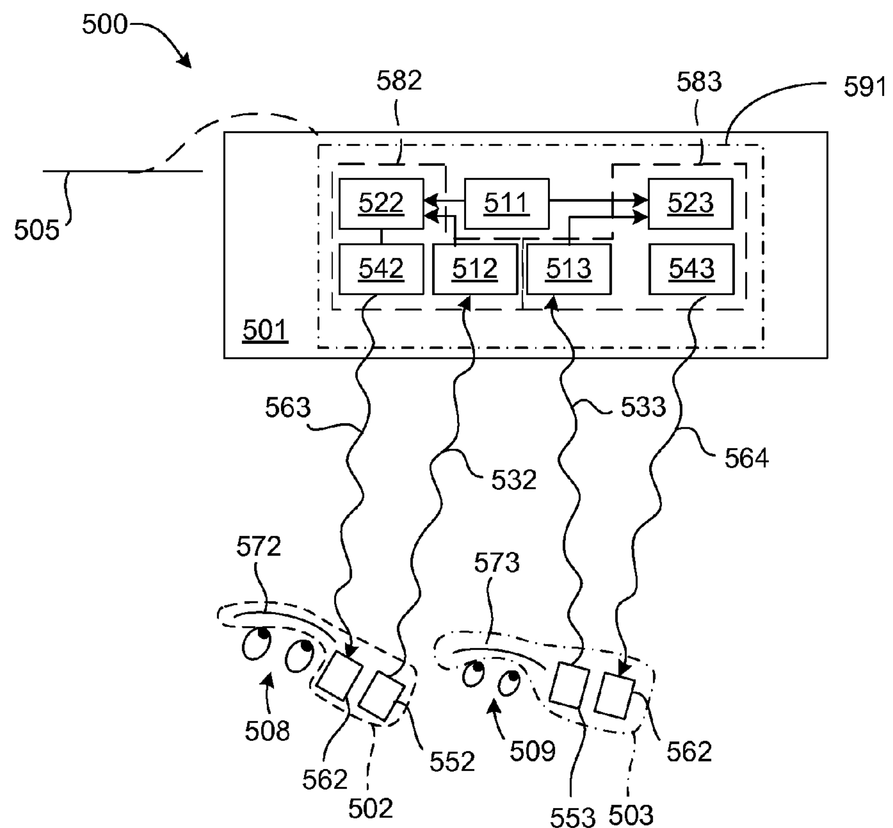
FIG. 5 is a diagrammatic block diagram showing various components and modules of a specific configuration of a networked 3D display system using near-to-eye display devices in accordance with one embodiment of the present invention.

These features enable more than one viewer, viewing from different positions to see image frames as if viewed from their own unique position. In one embodiment, as shown in FIG. 5, a system for displaying 3D images to a multiplicity of viewers at separate and different locations is shown.

In this embodiment, a system 500 includes an image production device 501 in communication with a plurality of near-to-eye display devices (here 502, 503) that are viewed by users 508, 509 respectively. The image production device 501 includes a material source module 511 arranged to provide initial stereoscopic 3D source content. Such can be a device that generates the content or receives the content from another source. The image production device 501 can comprise an originating source device comprising, but not limited to, set top boxes, DVD players, cameras, video recorders, game platforms, computers, HD video devices, cellular phones, smart phones, personal electronic devices, VCR devices, radio, satellite boxes, music players, content capture and content generation devices, and many other such source devices beyond those referenced above. Also, the device 501 can be simpler, with source module 511 comprising an interface device coupled with an external source device that provides the initial 3D stereoscopic content.

Additionally, the image production device 501 includes a set of receiver modules (512, 513) each configured to receive position related information from an associated one of the near-to-eye display devices 502, 503. Such information can come in many forms and formats. In one embodiment, the near-to-eye display devices 502, 503 provide the location of the near-to-eye display devices 502, 503 relative to a referent location 505. Alternatively, a receiver can function as a position identification and location calculation system receiving one or more inputs from each near-to-eye display device and from received inputs enabling a determination the position and orientation of the near-to-eye display devices 502, 503 relative to the referent 505. It should be pointed out that in cases where the device 501 receives location data 532, 533, from the near-to-eye display devices that require further processing to determine actual location. Such processing, for all the near-to-eye display devices, can be done by a single module of the device 501. Any one of several low cost position location systems can be used to sense and determine the relative location and orientation of the near-to-eye display devices.

Accordingly, each receiver is arranged in communication with an associated one of the near-to-eye display devices 502, 503. Such communication between the near-to-eye display devices and the associated receiver modules can be achieved using any of a number of different communication technologies, including wired and wireless technologies. Here, in this embodiment, near-to-eye display device 502 is coupled wirelessly 532 with receiver module 512 and near-to-eye display device 503 is coupled with receiver module 513. In this particular embodiment, the near-to-eye display device 502 of viewer 508 includes a wireless transmitter element 552 configured for transmitting suitable positional and orientation information that can be used as is to determine position and orientation or that can be used by the device 501 to determine the appropriate position and orientation. Similarly, the near-to-eye display device 503 of viewer 509 also includes a wireless transmitter element 553 configured for transmitting suitable positional and orientation information as described above with respect to transmitter 552. The position detection system could utilize other methods such as optics, or ultrasound. The display devices may be passive, merely detected by equipment in 501 (for instance 501 could contain a video camera that sees the display units), or active in transmitting some signal with a field pattern that is detected by 501 which is then able to measure the position & orientation.

Embodiments of the devices 501 can have many more such receiver devices each associated with a like number of near-to-eye display devices. Also, the system can operate with only one such near-to-eye display device and receiver module.

Importantly, the image production device 501 includes an image modification module (IMM 522, 523) for each near-to-eye display device. For example, in this embodiment IMM 522 is associated with near-to-eye display device 502 and similarly IMM 523 is associated with near-to-eye display device 503. Each IMM (522, 523) receives the position information concerning the associated near-to-eye display device (respectively, 502, 503) and also the initial stereoscopic source data from source module 511. The position and orientation information received from the associated near-to-eye display devices is used in association with the initial stereoscopic source data to enable the IMM's to generate modified viewable image data for output to the relevant near-to-eye display device. The modified viewable image data creates modified frames such as described above with reference to FIGS. 2-4.

Accordingly, modified viewable image data transmitters 542, 543 of the device 501 transmit streams of modified viewable image data 563, 564 to receiver elements 562, 563 of the associated near-to-eye display devices (respectively, 502, 503). The streams of modified viewable image data 563, 564 are viewed using display elements 572, 573 of the associated near-to-eye display devices 502, 503.

It is pointed out that on the device 501 the material source module 511 arranged to provide initial stereoscopic 3D source content, the receiver modules 512, 513, image modification modules 522, 523, and modified viewable image data transmitters 542, 543 can all comprise integrated circuits or systems of integrated circuits. Such can operate supporting software instructions that enable the described functions. Also, the circuitry can be hardwired to perform the described functions. Also, the operating instructions may comprise firmware forming part of the described circuit elements and modules. In general, there is a receiver module (e.g., 512), an image modification module (e.g., 522), and a modified viewable image data transmitter (e.g., 542) for each near-to-eye device to be used with the system. This group of circuit elements or modules can be referred to herein simply as a near-to-eye device driver (e.g., 582, 583). There can be one or many such drivers each enabling a near-to-eye display device. As shown in this view, the depicted modules can be embodied on a single system on a chip embodiment 591. It should be pointed out that any combination or sub-combination of these circuits and/or modules can be incorporated into system-on-a-chip configurations.

It is pointed out that many different types of near-to-eye devices (e.g., 502, 503) can be used in accordance with the invention. For example, a completely opaque viewing surface can be used. Examples including, but not limited to projection type devices as well as LED devices as well as many others. Light modulation embodiments can also be used, including but not limited to polarizers and other light gate technologies like variable actuation LED's. Such will perhaps be best viewed in conjunction with a light colored referent (for example a white background surface). Also, light emitting images such as reflected from a microarray of half-mirrored surfaces or a grating, such having the viewable image projected thereon. In such cases contrast and viewing fidelity can be enhanced using, for example, a dark colored referent (for example a black background surface). These referents have the advantage of enabling a very low cost device 501.

In an associated approach, the same overall system is used. An image production device 501 and associated multiplicity of near-to-eye display devices (e.g., 502, 503). Instead of a neutral referent 505 (black, white or other neutral display color helpful for emphasizing contrast in the modified image data viewed at the near-to-eye display devices. The referent 505 can be a standard type display device (i.e., a non-near-to-eye type display). In one implementation the display device can form a part of the image production device 501. Alternatively, the referent display could be a separate display device comprising a CRT, a LED display, and LCD, or any of a number of different types. In one particular embodiment, the display format could be a standard display format (that is to say non-3D) enabling viewers that do not have near-to-eye display devices to share in the experience. Thus, in one embodiment, each near-to-eye display can view a specific, positionally determined, modified 3D view of the content (unique to the position and orientation of the each near-to-eye display and its associated viewer) as well as enabling viewing of the source content by viewers without the near-to-eye displays. Such could include viewers using more low cost passive 3D viewers, including, for example, polarized 3D glasses, color differential type 3D glasses, Infinitec type glasses, and so on. Thus, the number of near-to-eye display devices does not impose an upper limit on the participatory experience.

Figure 6:
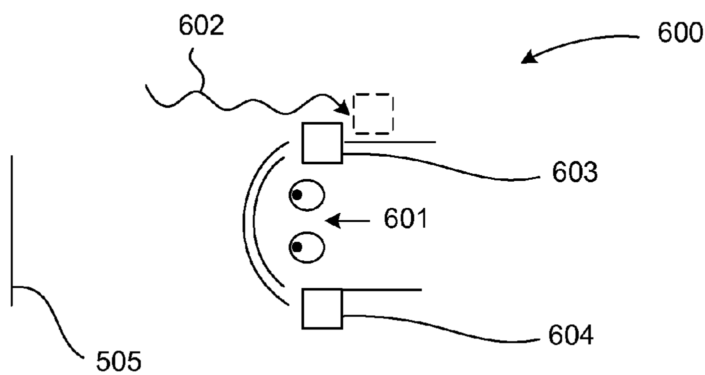
FIG. 6 is a diagrammatic block diagram showing various components and modules of a specific configuration of an embodiment of a near-to-eye display device in accordance with one embodiment of the present invention.

In another approach, much of the functionality can instead be performed by an enhanced near-to-eye display device. For example, with reference to FIG. 6, an embodiment of an enhanced near-to-eye display device 600 is shown. As with other near-to-eye display devices this device 600 can be worn over the eyes by a user 601. Here, a transmitter of a source device can provide the initial stereoscopic 3D source content (as well as, in some implementations, ancillary information) in the manner of a carrier signal 602. The carrier signal 602 is received by a receiver element 612 of the display device 600. The display device 600 further includes a position detector 603 configured to enable the position and orientation of the device 600 to be determined. In one preferred embodiment, the position and orientation of the device 600 is determined relative to the position of referent 502. This position information can be determined using any of a number of known means. Everything from MEMS gyroscopes and other micro-scale indicators, magnetic position indicators, wireless position and orientation detectors and many other such devices. This is to be interpreted broadly with reference to any position and orientation detection technologies being applicable to the device 600. Additionally, using inputs from the position detector 603 and the initial stereoscopic 3D source content an image modification module 604 can generate modified viewable image data such as described above. This modified viewable image data can be input into the display media 605 to provide a position and orientation sensitive viewable image for the user 601 to view. Although such viewer may have many applications, the size and weight of such devices may pose some implementation issues in certain applications.

Figure 7:
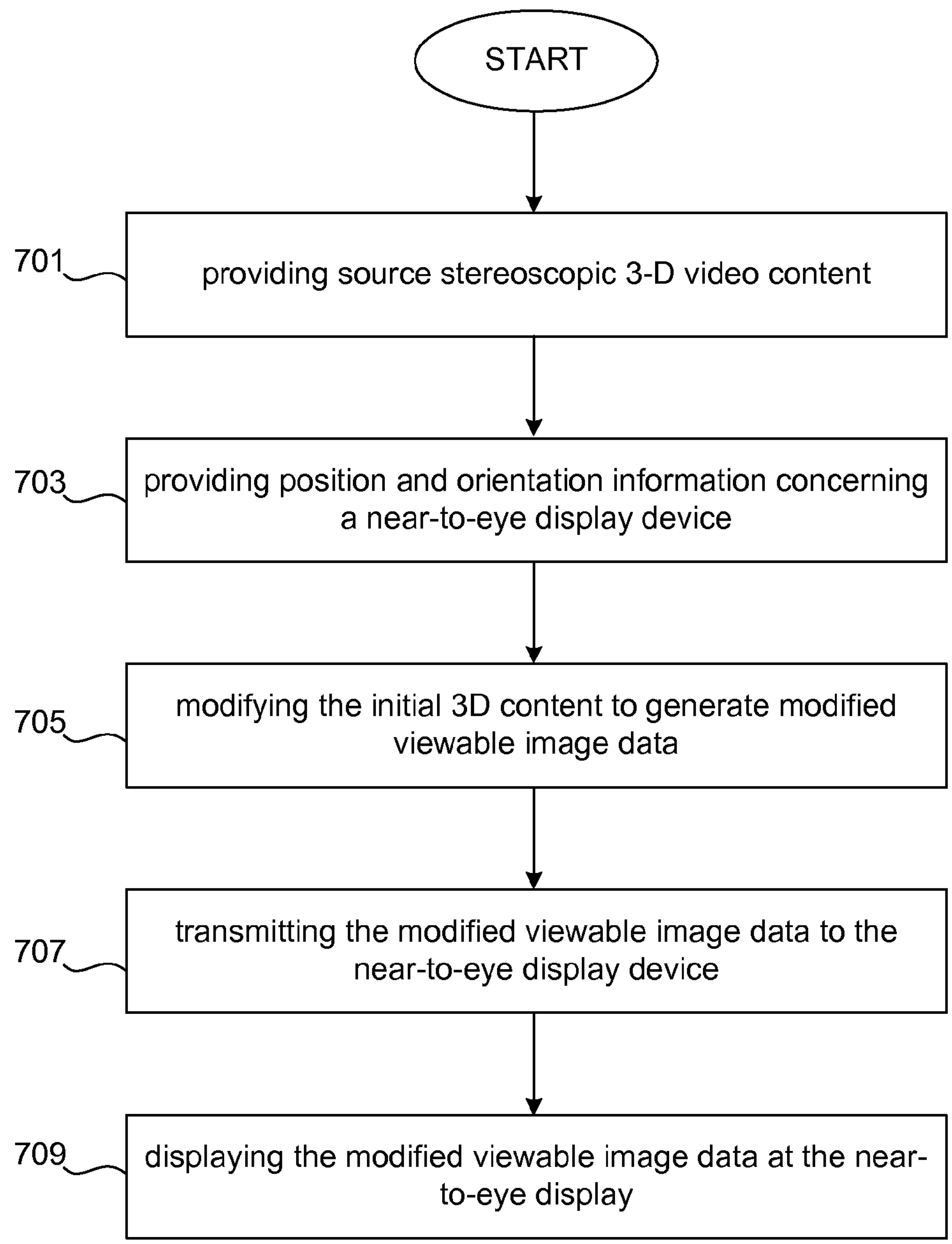
FIG. 7 is a flow diagram illustrating one approach for enabling more realistic 3D display of image frames using a near-to-eye display device at different positions and orientations (in one example, relative to a fixed referent) in accordance with the principles of the present invention.

FIG. 7 is a flow diagram that describes one example method implementation of enabling stereoscopic source 3D content to be viewed by a near-eye-display device. In particular the method describes methods that can operate one or more near-to-eye display devices to view 3D content differently depending on the position and orientation of the near-to-eye display device.

Initial stereoscopic source 3D content is provided (Step 701). As discussed above, this content comprises stereoscopic 3D multi-media content such as images and video and so on. The content can also include ancillary data concerning 3D information. For example a depth map can be provided with the data or the data can be renderable in a flexible 3D presentable format.

Also, location information concerning the position and orientation of a near-to-eye viewing device can be provided for use (Step 703). This information can include specific position and orientation information transmitted by a near-to-eye viewing device and received by a device suitable for modifying the 3D data. Or it can be information receivable at a processing site that will process the information to determine the position and orientation of the near-to-eye viewing device. In particular, position and orientation information can be provided for one or more near-to-eye display devices, thus providing unique position and orientation information for each device.

Using the position and orientation information, the stereoscopic source 3D content is modified or otherwise manipulated to generate modified viewable image data for the near-to-eye viewing device (Step 705). The modification is such that it produces modified viewable image data that compensates for changes in position and orientation of the near-to-eye viewing device as the near-to-eye viewing device is moved. For example, the modification can compensate for changes in position and orientation of the near-to-eye viewing device relative to a referent. In one approach, the location of the referent (and the size or the frame relative to the referent) can be synchronized or calibrated to the display media of the near-to-eye display device. The modified viewable image data provided to the near-to-eye display device is updated as the user (in particular the near-to-eye display device that the user is wearing) moves and changes position and orientation. Thus, an adapted set of image information is generated as the near-to-eye display device is moved. Also, the initial is modified for each near-to-eye display device depending on its own unique position and orientation (e.g., relative to the referent) to generate a plurality of sets of modified viewable image data. Thus, each data set is suitable for receiving by one of the plurality of near-to-eye viewing devices whereby each modification compensates for changes in position and orientation of the specified near-to-eye viewing device as it is moved or positioned.

The modified viewable image data is then transmitted to the near-to-eye display device (Step 707). As discussed above this can comprise wireless (or other mode) transmission of the signal to a receiver of the display device. The transmitted information is received at the near-to-eye display device. It can be stored in a buffer or otherwise processed.

Commonly, the modified viewable image data is then displayed by the near-to-eye display device (Step 709). Examples of some of these display modes have been explained above.

In addition, embodiments of the present invention further relate to integrated circuits and chips (including system on a chip (SOC)) and/or chip sets. By way of example, each of the devices described herein may include an integrated circuit chip or SOC for use in implementing the described embodiments and similar embodiments. Embodiments may also relate to computer storage products with a computer-readable medium that has computer code thereon for performing various computer-implemented operations. The media and computer code may be those specially designed and constructed for the purposes of the present invention, or they may be of the kind well known and available to those having skill in the computer software arts. Examples of tangible computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor. In addition to chips, chip systems, and chip sets, the invention can be embodied as firmware written to said chips and suitable for performing the processes just described.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer chip system configured to transmit stereoscopic 3D content to a near-to-eye viewing device, the chip comprising:

a material source module configured to provide stereoscopic source 3D content, wherein the stereoscopic source 3D content is presented in alternating left and right eye formats;

a receiver module configured to receive a location signal from a positional and orientation indicator of a near-to-eye viewing device, wherein the location signal includes information relating to a position and an orientation of the near-to-eye viewing device;

an image modification module configured to modify the source 3D content to generate modified viewable image data for the near-to-eye viewing device, wherein the modification to the source 3D content compensates for changes in the position and the orientation of the near-to-eye viewing device relative to a referent as the near-to-eye viewing device moves; and a transmitter configured to transmit the modified viewable image to the near-to-eye viewing device for viewing.

2. The computer chip system of claim 1, wherein the system further includes a plurality of receiver modules, a corresponding plurality of transmitters, and a corresponding plurality of image modification modules, arranged in a corresponding plurality of sets, each set associated with a specific one of a corresponding plurality of associated near-to-eye viewing devices;

wherein each image modification module is configured to modify the source 3D content individually for its corresponding near-to-eye viewing device to generate an individual stream of modified viewable image data, each stream associated with the corresponding near-to-eye viewing device, wherein the individual modifications to the source 3D content compensate for changes in position and orientation of the corresponding near-to-eye viewing device relative to the referent as the corresponding near-to-eye viewing device moves.

3. The computer chip system of claim 1, wherein the image modification module is configured to generate modified viewable image data that simulates a virtual view screen having virtual screen boundaries of an apparent shape and size appearing in the referent.

4. The computer chip system of claim 3, wherein the image modification module is configured to deactivate image presentation at the near-to-eye viewing device for portions of said image that are not within the confines of said virtual screen view.

5. The computer chip system of claim 1, wherein the image modification module is configured to alter a rendering of the source 3D content to accommodate changes in parallax related to changes in position and orientation of the near-to-eye viewing device, wherein an orientation of foreground and background objects in the modified viewable image data is changed as the orientation and the position of the near-to-eye viewing device change.

6. The computer chip system of claim 1, wherein the computer chip system is incorporated into a 3D image production device.

7. The computer chip system of claim 1, wherein the computer chip system is incorporated into a 3D video display device that includes a display screen, wherein the display screen comprises the referent.

8. The computer chip system of claim 7, wherein the display screen is configured to present non-3D content adapted for viewing by participants viewing without near-to-eye viewing devices.

9. The computer chip system of claim 1, wherein the near-to-eye viewing device includes a display media viewable by a user of the near-to-eye viewing device and the modified viewable image data is configured to enable a user to observe portions of a background environment through portions of the display media.

10. A computer chip system for use with a near-to-eye viewing device, the chip comprising:

a receiver configured to receive stereoscopic source 3D content, wherein the stereoscopic source 3D content is presented in alternating left and right eye formats;

a positional and orientation indicator configured to determine information relating to a position and an orientation of a near-to-eye viewing device; and an image modification module configured to modify the source 3D content to generate modified viewable image data, wherein the modified viewable image data compensates for changes in the position and the orientation of the near-to-eye viewing device relative to a referent as the near-to-eye viewing device moves.

11. The computer chip system of claim 10, wherein the chip is incorporated into the near-to-eye viewing device, the near-to-eye viewing device further comprising a display media viewable by a wearer when the near-to-eye display device is worn and wherein the image modification module is configured to display the modified viewable image data on the display media.

12. The computer chip system of claim 11, wherein the modified viewable image data is configured to enable a user to observe portions of a background environment through portions of the display media.

13. A method for enabling stereoscopic source 3D content to be viewed by a near-to-eye viewing device, the method comprising:

receiving initial stereoscopic source 3D content, wherein the stereoscopic source 3D content is presented in alternating left and right eye formats;

receiving location information relating to a position and an orientation of a near-to-eye viewing device;

modifying the initial stereoscopic source 3D content to generate modified viewable image data that compensates for changes in the position and the orientation of the near-to-eye viewing device, wherein the modification to the initial stereoscopic source 3D content compensates for changes in the position and the orientation of the near-to-eye viewing device relative to a referent as the near-to-eye viewing device moves; and transmitting the modified viewable image data to the near-to-eye viewing device for viewing.

14. The method recited in claim 13, wherein:

receiving location information includes receiving location information concerning positions and orientations of a plurality of near-to-eye viewing devices;

modifying the initial stereoscopic source 3D content comprises modifying the initial stereoscopic source 3D content to generate a plurality of sets of modified viewable image data, each set suitable for receiving by an associated one of the plurality of near-to-eye viewing devices; and transmitting the modified viewable image comprises transmitting each set to the associated one of the plurality of near-to-eye viewing devices.

15. The method recited in claim 14, wherein modifying the initial stereoscopic source 3D content further comprises modifying the initial stereoscopic source 3D content to generate a non-3D rendering adapted for viewing by participants viewing without near-to-eye viewing devices.

16. The method recited in claim 13, wherein the modified viewable image data simulates a virtual view screen having virtual screen boundaries of an apparent shape and size appearing at the referent.

17. The method recited in claim 16, wherein modifying the initial stereoscopic source 3D content further comprises generating modified viewable image data that deactivates portions of the modified viewable image data that lie outside the virtual screen boundaries of the virtual view screen.

18. The method recited in claim 17, wherein modifying the initial stereoscopic source 3D content further comprises changing a position of the virtual view screen in the modified viewable image data in response to a change in the position and the orientation of the near-to-eye viewing device.

19. The method recited in claim 13, wherein modifying the initial stereoscopic source 3D content further comprises rendering the source 3D content to accommodate changes in parallax related to changes in position and orientation of the near-to-eye viewing device, wherein an orientation of foreground and background objects in the viewable image data is changed as the orientation and the position of the near near-to-eye viewing device change.

20. The method recited in claim 13, wherein the method is executed by an integrated circuit of a multi-media source device configured to enable communication between the multi-media source device and the near-to-eye viewing device, and wherein the method is embodied as computer-executable instructions on a tangible, non-transitory computer readable media.

21. The method recited in claim 20, wherein the computer executed instructions are embodied as firmware on the integrated circuit.

22. A system configured to enable a user to view 3D content using fixed virtual referent, the system comprising:

a source device configured to provide stereoscopic 3D content, wherein the stereoscopic source 3D content is presented in alternating left and right eye formats;

a near-to-eye viewing device having a positional and orientation indicator configured to determine a position and an orientation of the viewing device; and an image modification module configured to modify the source 3D content to generate modified viewable content for the near-to-eye viewing device, wherein the modification compensates for changes in the position and the orientation of the near-to-eye viewing device relative to a referent, wherein the near-to-eye viewing device is configured to display the modified viewable content.

23. The system of claim 22, wherein the source device includes:

the image modification module;

a receiver module configured to receive a location signal from the positional and orientation indicator of the near-to-eye viewing device, wherein the location signal includes information relating to the position and the orientation of the near-to-eye viewing device; and a transmitter module configured to transmit the modified viewable content to the near-to-eye viewing device, wherein the near-to-eye viewing device includes a receiver configured to receive the transmitted modified viewable content.

24. The system of claim 22, wherein the near-to-eye viewing device includes:

a receiver configured to receive the stereoscopic 3D content from the source; and the image modification module.

25. The system of claim 22, wherein the referent is a display device configured to display content associated with the stereoscopic source 3D content.

26. The system of claim 22, wherein the referent comprises a dark surface; and wherein the modified viewable content includes images positioned to be viewed against the dark surface of the referent.

27. The system of claim 22, wherein the referent comprises a light surface; and wherein the near eye viewing device includes a display media configured to modulate light coming through the display media, and the modified viewable content includes images positioned to be viewed against the light surface of the referent.

* * * * *